J. C. WILSON & H. N. PACKARD.
MEANS FOR REGULATING TEMPERATURE.
APPLICATION FILED AUG. 16, 1913.
1,261,086.
Patented Apr. 2, 1918.
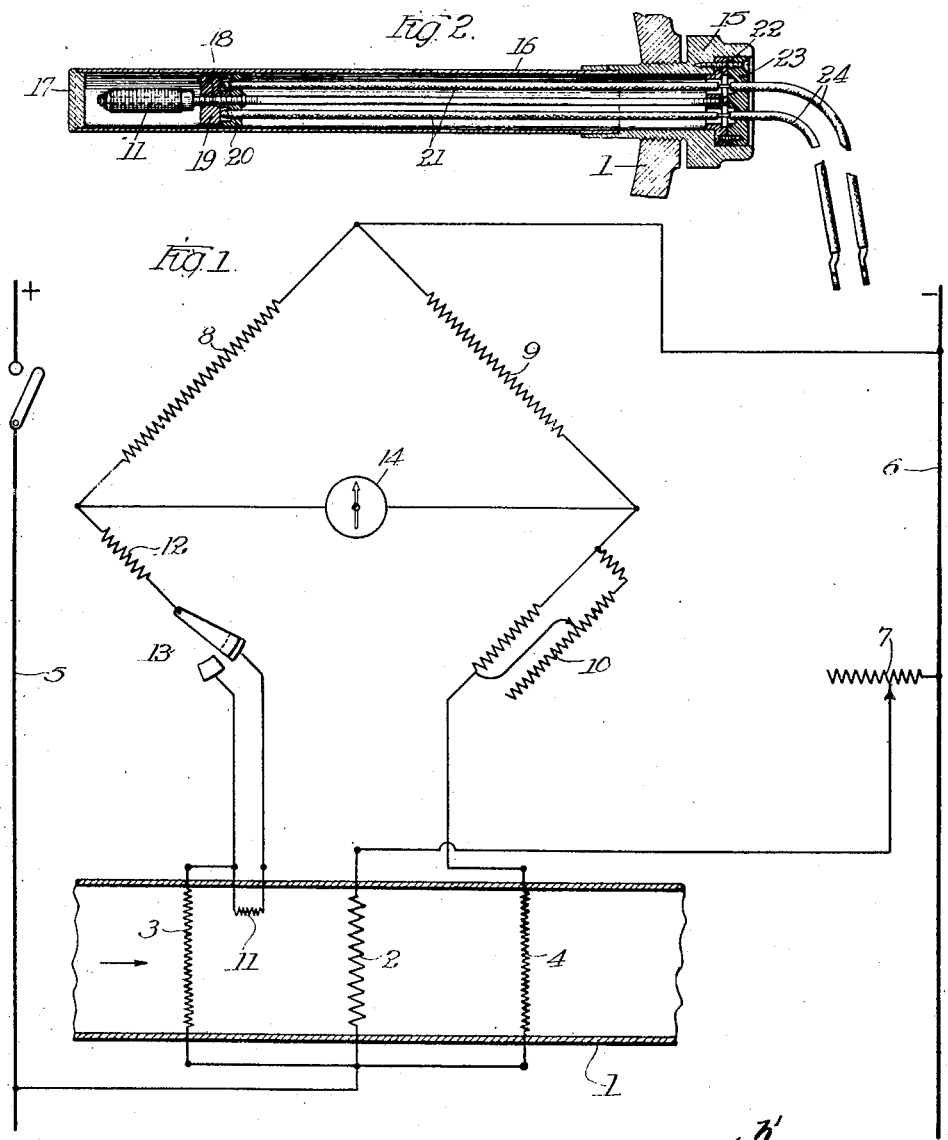
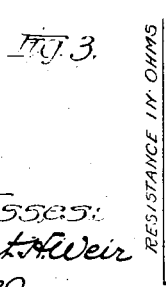

UNITED STATES PATENT OFFICE.

JOHN C. WILSON AND HORACE N. PACKARD, OF MILWAUKEE, WISCONSIN, ASSIGNORS TO THE CUTLER-HAMMER MFG. CO., OF MILWAUKEE, WISCONSIN, A CORPORATION OF WISCONSIN.

MEANS FOR REGULATING TEMPERATURE.

1,261,086.  Specification of Letters Patent.  Patented Apr. 2, 1918.

Application filed August 16, 1913. Serial No. 785,120.

*To all whom it may concern:*

Be it known that we, JOHN C. WILSON and HORACE N. PACKARD, citizens of the United States, residing at Milwaukee, in the county of Milwaukee and State of Wisconsin, have invented new and useful Improvements in Means for Regulating Temperature, of which the following is a full, clear, concise, and exact description, reference being had to the accompanying drawing, forming a part of this specification.

This invention relates to thermal measuring and controlling apparatus and methods, and also to thermal fluid meters involving the use of such apparatus and methods.

The patent to C. C. Thomas, No. 1,222,492 of April 10th, 1917, discloses a meter for measuring the flow of fluid in which the moving body of fluid is heated by an electrical heating element. An electric thermometer resistance is arranged in advance of said heating element and hence serves as a measure of the temperature of the fluid before the heating thereof. A similar electric thermometer resistance is arranged in the rear of said heating element and serves as a measure of the temperature of the fluid after heating. By means of a control device in connection with these two thermometer resistances, the electrical energy supplied to the heating element is automatically regulated so that the heat dissipated thereby will cause a constant temperature difference to be maintained between the two points where the thermometer resistances are located.

One object of the invention is to provide an improved thermal control method and apparatus such as may be used in a meter of the type above described.

Another object is to provide an improved thermal measuring method and apparatus.

Another object is to provide a method of and apparatus for obtaining accurate thermal measurements.

Another object is to provide an improved method of and apparatus for maintaining a predetermined temperature in a medium, or a predetermined temperature difference between two points.

Another object is to provide a thermal fluid meter having improved thermal controlling and measuring means.

Another object is to provide an improved method of and apparatus for accurately measuring the flow of a fluid.

Another object is to provide a method of and apparatus for fluid measurement wherein the inaccuracies introduced by the variations in the physical condition of the fluid are reduced.

Other objects will appear as the specification proceeds.

In the accompanying drawings we have illustrated, somewhat diagrammatically in Figure 1, the embodiment of the invention referred to above. Fig. 2 is a sectional elevation of the auxiliary resistance and its casing. Fig. 3 is an explanatory diagram.

The moving body of steam, gas, or other fluid is directed through a suitable chamber or conduit 1, and flows past the heating resistance 2, the latter being preferably uniformly disposed across the conduit. Said heating resistance may assume various forms, but as the form of the resistance forms no part of the present invention, said resistance is illustrated only diagrammatically. The thermometer resistances 3 and 4 are also illustrated only diagrammatically, and in practice are uniformly disposed across the conduit. The ohmic resistance of thermometer resistance 3 is a measure of the temperature of the incoming fluid, and the ohmic resistance of thermometer resistance 4 is a measure of the temperature of the fluid after it has been heated.

The resistances 3 and 4 are connected in two of the legs of a Wheatstone bridge, and hence are balanced against each other. The heating resistance 2 is connected to the mains 5, 6, in series with a regulating resistance 7. The resistance 7 may be regulated to vary the heating effect of the resistance 2. The regulating means is only diagrammatically illustrated as any suitable means may be used for this purpose. For instance, the resistance 7 may be varied by means of the control device shown in the above mentioned patent to Thomas to vary the heating effect. The Wheatstone bridge also receives current from said mains, as shown, and has resistances 8, 9, in the other two legs thereof. An adjustable resistance 10 is connected in series with the thermometer resistance 4 and an auxiliary resistance 11 is connected in series with the thermometer resistance 3. The auxiliary resistance may be termed a temperature difference resistance, for reasons hereinafter explained. A second resistance 12 is also connected in series with said thermometer resistance 3.

In meters of this character as designed heretofore, the resistance 11 has been arranged outside of the conduit 1. When the fluid is being heated, the difference in the ohmic resistance of the two thermometer resistances 3, 4, is balanced by the resistance 11 connected in series with the former. The rheostat 7 is automatically controlled by suitable means such as shown in the above mentioned Thomas patent to vary the current flowing through the heater 2, in such a manner as to maintain constant the difference in temperature of the two thermometer resistances. Said thermometer resistances are similar in construction and are made of the same resistance material, as it is desirable that their resistances be equal when their temperatures are equal, throughout the working range of the meter. With fluid flowing through the conduit, with the heater circuit broken so that no heat is being dissipated from the heater unit, and with the resistance 11 short-circuited by means of a switch 13 or plug usually supplied for the purpose, the Wheatstone bridge will balance if it has been properly adjusted by means of the adjustable resistance 10. The condition of proper balance is indicated by the galvanometer 14. Similarly, when the meter is in operation, the Wheatstone bridge is also at a balance, the combined ohmic value of resistance 11 and thermometer resistance 3 being just equal to the ohmic value of the thermometer resistance 4, the resistance of the latter being now greater, due to the heat imparted thereto by the heated fluid. Any deviation from the predetermined constant temperature difference causes an unbalancing of the system and is indicated by the galvanometer, whereupon the energy dissipated in the form of heat is varied to restore the balance. It will be seen that the energy dissipated is a measure of the flow of the fluid. If more gas is flowing, it will require more energy to maintain the constant temperature difference. If less gas is flowing, less energy will be required. By the use of a wattmeter in conjunction with suitable calibration curves, the flow of the fluid may be readily determined, regardless of variations in temperature and pressure thereof.

The thermometer resistances are constructed preferably of nickel wire. The temperature-resistance curve of nickel and of a number of other materials suitable for the present purpose is not a straight line but a curve as shown in Fig. 3. In Fig. 3 the abscissæ represent degrees Fahrenheit and the ordinates represent resistance in ohms. The solid line represents the temperature-resistance curve of a material such as nickel. It will be noted that the increment $a—b$ representing the increase in resistance per given increase in temperature increases as the temperature increases. For instance, at 60° a two degree increase in temperature will cause an increase in resistance represented by the distance $a—b$. At 80°, however, the same temperature rise will cause a greater increase in resistance represented by the distance $a'—b'$. It will be noted that the value of $a'—b'$ is greater than $a—b$ because the slope of the curve at B is greater than at A. There are, however, materials for which this increment decreases as the temperature increases and of course the thermometer resistances might be made of such material. The temperature-resistance curve of such a material is represented by the dotted line which is convexed upwardly instead of downwardly. The slope of such a curve is greater at A than at B.

The above characteristic of nickel and similar materials tends to produce an error in the reading of the meter because the temperature of the incoming fluid varies. For instance, if the fluid reaches the meter at 60° and is heated two degrees by the heater the ohmic value of the entrance thermometer resistance will be represented by $a$ and that of the exit thermometer resistance will be represented by $b$. If, however, the fluid reaches the meter at 80° and is heated two degrees by the heater the ohmic value of the entrance thermometer resistance will be represented by $a'$ and that of the exit thermometer resistance will be represented by $b'$. As above stated the value of $a'—b'$ representing the difference in resistance between the thermometer resistances when the fluid is heated from 80 to 82° is greater than the value of $a—b$ representing the difference in resistance between the two thermometer resistances when the fluid is heated from 60 to 62°.

Therefore the difference in ohmic resistance between the two thermometer resistances is greater for higher temperatures than for lower temperatures even though the fluid be heated the same amount for all temperatures of the incoming fluid. This variation in the difference in resistance between the two thermometer resistances for different temperatures should be compensated for in order to make the meter read accurately. This is one function of the resistance 11 as will hereinafter appear.

If the temperature of the approaching fluid were always the same the constant difference in resistance between the two thermometer resistances would always correspond to a certain value of resistance and the resistance 11 would accurately correspond to said constant difference of resistance even if it were a resistance of fixed value. However, the temperature of the incoming fluid usually varies thus causing the difference in resistance between the thermometer resistances to vary for a given rise in temperature as above explained, and therefore the resistance 11 should not be of a fixed value.

In order to obviate the error in the calculations or registrations of the meter, due to the fact that the temperature resistance curve is not a straight line, the temperature difference resistance is constructed of a material which will vary its resistance when the temperature varies in such a way as to compensate for the above described varying difference in resistance between the two thermometer resistances for different temperatures. This resistance is then mounted within the conduit, as shown in Fig. 1, instead of outside of the same, and hence it is subjected to the same variations in temperature as those to which the thermometers are subjected. Said resistance may be mounted either in front of or behind the heating element, as its function is to change its resistance with changes in the absolute temperature of the gas rather than with changes in the relative temperatures of two points therein. We locate it preferably, however, in advance of said heating element.

When the meter is in operation, the variation in the resistance of the temperature difference resistance off-sets the error which would otherwise be caused due to the operation of the meter throughout different temperature ranges. In other words, when the resistance of the entrance thermometer is low, the resistance of the temperature difference resistance is also low. When the resistance of the entrance thermometer is high, the resistance of the temperature difference resistance is higher than formerly. Hence, the flow of the fluid may be very accurately determined for all working conditions.

For many fluids the specific heat of the standard unit of measurement, which is usually a cubic foot under given conditions of temperature and pressure, is very nearly constant for all working ranges of temperature and pressure. So long as this specific heat is constant and so long as the temperature rise is kept constant, the electrical energy measured by the wattmeter is a direct measure of the rate of flow of the fluid. The invention, as described above, provides means for maintaining a constant temperature difference with resistance thermometers under conditions that tend to cause this temperature difference to depart from a constant.

Under some conditions, the specific heat of the fluid does not, in effect, remain constant however, under different conditions of temperature and pressure. For example, let us assume that a saturated fluid at 760 millimeters pressure and 60 degrees F. be heated to 100 degrees F. Its specific heat at either temperature is nearly the same, but if it is allowed to absorb all the aqueous vapor that it will hold at 100 degrees, that is, if it absorbs additional aqueous vapor until it is saturated at 100 degrees, each original cubic foot of fluid will carry through the meter this added quantity of aqueous vapor. This added vapor will require an additional amount of heat to raise its temperature the fixed amount and the meter will read too high. It is desired in commercial work that the meter record in units of fluid saturated at 60 degrees, regardless of the actual temperature of the fluid flowing through the meter. In this case the quantity of aqueous vapor absorbed, and the error due to it, are functions of temperature. Now, if, as the temperature of the fluid increases and the specific heat correspondingly increases, the temperature difference can be correspondingly decreased, the meter will record correctly. This is apparent from the fundamental equation, $$\frac{\text{Cu. ft.} \times \text{specific heat} \times \text{temperature rise}}{\text{Constant}} = \text{kilowatts.}$$

From this equation it is seen that if the temperature difference can be decreased by the same percentage as the specific heat is increased, the meter will still record correctly. This is true, of course, regardless of whether water vapor or other vapor is contained in the fluid.

Now with thermometer resistances having a straight line temperature-resistance curve, a temperature difference resistance can be so designed as to compensate for this variation in specific heat due to water vapor or to similar causes. For example, the variation in specific heat due to water vapor is a function of temperature of the fluid; that is, the specific heat increases as the temperature of the fluid increases. By making the temperature difference resistance of a material which decreases its resistance with increase in temperature and putting this resistance in the fluid, the variation in temperature rise in the meter due to this variation in the temperature difference resistance may be made to compensate for the variation in the specific heat of the fluid.

As described above, if the thermometer resistances are of nickel, and if a constant temperature difference is to be maintained in the meter as the temperature of the fluid is increased, the temperature difference resistance must be increased. If the fluid contains water vapor, however, and if the variations in specific heat, due to the presence of this water vapor, are to be compensated, the value of the temperature difference must be decreased as the temperature increases. If then nickel wire thermometers are employed in the measurement of saturated fluids at varying temperatures, the variation in temperature difference due to the curvature of the temperature-resistance curve for the thermometers, tends to compensate for the variation in the specific heat of the gas due to the presence of water vapors at different temperatures. By making the temperature difference resistance of the proper materials and so locating it that the temperature varies with the temperature of the fluid, these two errors may be entirely compensated or sufficiently compensated for practical results.

It is assumed, therefore, that the resistance 11 is of such material as to accomplish the above results. A resistance suitable for this purpose would be one constructed of nickel and manganese, for example, part of the resistance wire being of nickel and the other part of manganese, the relative proportions of which may be varied to meet varying conditions. In practice the resistance 11 is mounted independently of the thermometers. One form of support therefor is shown in Fig. 2, in which said resistance is completely inclosed within a metallic tube or casing comprising a head 15 having screw-threaded engagement with the wall 1 of the meter housing and having a metal tube 16 fitting within said head and preferably sweated thereto. Said tube is closed at its distant end by a metallic plug 17. The resistance is mounted on a suitable support carried by a screw-threaded rod 18, the latter passing through openings in a pair of insulating disks or blocks 19, 20. Suitable conductors 21 pass through these blocks through a pair of openings in each, the openings in one being preferably offset with respect to the openings in the other, and the ends of said conductors being electrically connected with the resistance. The other ends of said conductors are received within suitable openings in an insulating disk 22, which, together with a second insulating disk or plug 23, is secured in the outer end of the head 15. Conductors 24 extend through suitable openings in the disk 23 and are electrically connected to the conductors 21, the space between said disks being filled preferably with some suitable insulating compound such as pitch.

With the above described arrangement it will be seen that the resistance 11 may be conveniently located at any desired point within the meter housing or other structure. Furthermore, its casing may be readily removed simply by unscrewing it from the wall in which it is supported. The resistance itself, while subjected to the desired temperature, is protected from direct contact with the medium of whose temperature it serves as a measure.

It is advantageous to have this resistance separate and independent of the thermometers, because, as above stated, it is desirable to balance the thermometers against each other with the heating circuit broken and with said resistance short-circuited in order to check the zero balance of the thermometers from time to time during operation, and this may be readily accomplished with such an arrangement. It is also desirable that the short-circuiting of said resistance be accomplished from the recording panel or other convenient point outside of the meter housing. Such operation is feasible with the arrangement illustrated in Fig. 1, as the leads from said resistance may extend as far as necessary to reach a convenient location. Although said leads may in certain cases be of considerable length such that their resistances are an appreciable factor as compared with the resistance of the coil itself, nevertheless, since the resistance of said leads can be made the same, the resistance of one offsets the resistance of the other, regardless of which lead is connected as part of the circuit by means of the switch 13. It will also be noted in connection with said switch that the latter is so constructed in regard to the width of its blade that the movement thereof from one position to the other never opens the circuit through the leg of the Wheatstone bridge in which it is connected. Such an opening of the circuit would be objectionable, as the galvanometer needle would be thrown over to one extreme position, which operation might result in burning out certain of the coils.

While the above described system of regulation is illustrated in connection with a fluid meter, it is apparent that it may be used to maintain a predetermined (either constant or variable) temperature difference between any two points. It is therefore an example of maintaining a predetermined difference in temperature which tends to vary with actual temperatures. As a further example, it might be used to maintain the temperature of a furnace a predetermined amount above the atmospheric temperature by regulating the heat supply, or it might be used in various other relations in the arts, which will readily suggest themselves. It will be seen, furthermore, that the temperature of a given medium may be maintained by the use of a single thermometer resistance located in said medium and an additional thermometer resistance made of a material having a constant ohmic resistance corresponding to the temperature to which the temperature of the medium is referred. It is not essential that the two thermometer resistances be located necessarily in two different mediums, but merely that one thermometer serve as a measure of a certain temperature and that said temperature be compared with some other temperature as a standard. Furthermore, the variation of the resistance of the circuit of one of said thermometers need not necessarily be accomplished by the use of an auxiliary resistance, such as the resistance 11 previously described, but may be varied mechanically in accordance with a predetermined law, or it may be varied manually. It is apparent, of course, that in any application of the temperature difference resistance, that said resistance need not necessarily be subjected directly to the same physical contact with the fluid as the thermometer resistances, the important point being that said resistance be subjected to the same temperature variations as those which affect said thermometer resistances. The invention accordingly, as above emphasized, is not limited to the particular embodiment thereof described and illustrated, as we desire to cover in the appended claims whatever other suitable means may be devised for accomplishing the desired results wherever said means fall within the scope of said claims.

What we claim as new and desire to secure by Letters Patent of the United States is:

1. A system of control for regulating the temperature of a given medium, comprising a resistance element which serves as a measure of the temperature of said medium, and means other than said resistance element for varying the resistance of the circuit thereof.

2. A system of control for regulating the temperature of a given medium, comprising a resistance element which serves as a measure of the temperature of said medium, means controlled by variations in the current flowing through said resistance element due to variations in the resistance thereof for automatically varying the heating of said medium, and means other than said resistance element for varying the resistance of the circuit thereof as the temperature of said element changes.

3. A system of control for regulating the temperature of a given medium, comprising a plurality of resistance elements one of which serves as a measure of the temperature of said medium and the other of which serves as a standard with respect to which the temperature of said medium is to be regulated, means controlled by variations in the resistance of the circuit of one of said resistances for automatically varying the heating of said medium, and means for varying the resistance of the circuit of one of said resistance elements as its temperature changes.

4. A system of temperature control for regulating the difference in temperature between two mediums in accordance with a predetermined law, comprising a resistance element located in each of said mediums and acting as a measure of the temperature thereof, means for automatically varying the resistance of one of said resistance elements, and means responsive to said variations for effecting the desired temperature difference.

5. In a temperature control device, means for measuring the temperature of a medium with respect to some other temperature, comprising a pair of resistance elements, means for varying the temperature of said medium said means being controlled by said resistance elements, and means for varying the resistance of the circuit of one of said resistance elements to control the temperature of said medium in accordance with a predetermined law.

6. In a temperature control device, a Wheatstone bridge, a resistance connected in one arm thereof, and a second resistance connected in series with said first resistance and so located that its temperature varies with that of said first resistance.

7. A system of temperature control for maintaining a predetermined temperature difference between two mediums, comprising a resistance element located in each of the respective mediums acting as a measure of the temperature of said mediums, and means for automatically varying the resistance of the circuit of one of said resistance elements in accordance with variations in the absolute temperature of one of said mediums.

8. A system of temperature control for maintaining a predetermined temperature difference between two mediums, comprising a resistance element located in each of the respective mediums acting as a measure of the temperature of said mediums, heating means for maintaining a difference in the relative temperatures of said mediums, means for automatically varying the resistance of the circuit of one of said resistance elements in accordance with variations in the absolute temperature of one of said mediums, and a regulator for said heating means controlled by said resistance elements.

9. Means for compensating for variations in the specific heat of gases due to variations in temperature, comprising a suitable resistance material subjected to the said variations in temperature, whereby its resistance varies accordingly, and heating means for said gases regulated by said variations in resistance.

10. In a fluid meter, a heating element for imparting heat to the fluid flowing therethrough, two resistance thermometers arranged one on each side of said heating element, and means for automatically varying the resistance of the circuit in which one of said thermometers is connected in accordance with variations in the temperature of the fluid to be heated.

11. In a fluid meter, a heating element for imparting heat to the fluid flowing therethrough, two resistance thermometers arranged one on each side of said heating element, and means for automatically varying the resistance of the circuit in which one of the thermometers is connected in accordance with variations in the temperature of the fluid to be heated, said means comprising a resistance element which is subjected to the same variations in temperature as said thermometer.

12. In a fluid meter, a heating element for imparting heat to the fluid flowing therethrough, two resistance thermometers arranged one on each side of said heating element, and means for automatically varying the resistance of the circuit in which one of the thermometers is connected in accordance with variations in the temperature of the fluid to be heated, said means comprising a resistance element arranged in the flowing steam or gas.

13. In a fluid meter, a pair of resistance thermometers for measuring the difference in temperature of two different points in a flowing body of fluid, said thermometers being substantially similar and constructed of the same resistance material, and an additional resistance connected in series with the one normally having the least resistance and arranged in said flowing body of steam or gas, said additional resistance being constructed of material which varies its resistance with variations in temperature to compensate for the variations in the resistance value at different temperatures which represents the temperature difference between the thermometers.

14. In a fluid meter, a pair of resistance thermometers for measuring the difference in temperature of two different points in a flowing body of fluid, said thermometers being substantially similar and constructed of the same resistance material, and an additional resistance of different material than the thermometers, said resistance being connected in series with the one normally having the least resistance and subjected to the temperature of said flowing body of fluid before the same is heated.

15. In a temperature control device, a resistance subjected to the temperature of a given medium, and means for rendering said resistance operative at will by connecting it in circuit or disconnecting it therefrom, said means including a switch and conductors of equal resistance extending from the terminals of said switch to the terminals of said resistance.

16. In a temperature control of the class described, a resistance subjected to the temperature of the medium to be controlled, and a switch controlling the connections to said resistance, said switch comprising a plurality of contacts and a movable switch blade adapted to momentarily bridge both contacts when moving from one to the other.

17. The method of determining the rate of flow of fluids which consists in imparting heat to the flowing stream and automatically varying the rate of heat dissipation to maintain constant the rise in temperature between two thermometers arranged one on each side of the heating element and automatically adding to the resistance of the cooler thermometer a variable resistance to compensate for variations which would otherwise occur within the range in temperature throughout which the meter is effective.

18. The method of compensating for variations in the physical properties of a given medium, due to temperature changes therein, which consists in subjecting to said temperature changes a resistance which varies in value in the same characteristic manner as said physical properties and in modifying the temperature of said medium in accordance with said variations in resistance.

19. Means for effecting accurate thermal measurements, comprising a resistance responsive to the temperature of the medium being measured, said resistance having portions of different physical characteristics so selected and arranged that the difference in ohmic resistance between said resistance and a standard corresponds to a fixed temperature difference between the medium and that of a standard through a desired range of temperatures.

20. Means for measuring the temperature change of a medium comprising a pair of electrically connected thermometer resistances and a compensating resistance associated with at least one of the thermometer resistances to compensate for errors due to variations in the physical condition of the medium.

21. A system of control for regulating the temperature of a given medium comprising a resistance element which serves as a measure of the temperature of said medium, and a means other than said resistance element for varying the resistance of the circuit thereof as the temperature of said element changes.

22. A system of control for regulating the temperature of a given medium, comprising a resistance element which serves as a measure of the temperature of said medium, and means other than said resistance element for automatically varying the resistance of the circuit thereof.

23. The method of determining the rate of flow of fluids which consists in causing a heat interchange between a body and the fluid, automatically varying the rate of heat interchange to maintain a constant temperature change between two thermometer resistances arranged one on each side of said body, and automatically adding to the resistance of one of said thermometer resistances a variable resistance to compensate for variations which would otherwise occur within the range in temperature throughout which the meter is effective.

24. The method of determining the rate of flow of a fluid which consists in maintaining a constant thermal change in the fluid between two thermometer resistances located therein, and automatically adding to the resistance of one of said thermometer resistances a variable resistance to compensate for variations which would otherwise occur within the range in temperature throughout which the meter is effective.

In witness whereof we have hereunto subscribed our names in the presence of two witnesses.

JOHN C. WILSON.
HORACE N. PACKARD.

Witnesses:
 C. R. POE,
 F. H. HUBBARD.